Patented Apr. 23, 1935

1,998,845

UNITED STATES PATENT OFFICE 1,998,845

PROCESS ADAPTED TO CONVERT SICCATIVE OIL INTO AN EMULSION FOR APPLICATION ON SURFACES OF CEMENT, WOOD, OR STUCCO

Orlando da Cruz Sardinha, Rio de Janeiro, Brazil

No Drawing. Application April 25, 1932,
Serial No. 607,496

2 Claims. (Cl. 134—46)

The object of this invention is to produce a new industrial product containing a siccative oil in the form of an emulsion or colloidal solution in water for application on cement, lime, wood or stucco surfaces.

This invention consists in the use of Oiticica oil, or other siccative oils, in the form of an emulsion, or colloidal solution in water, obtained by catalytic treatment of the oil, pure or with resins, with different metallic oxides, as zinc oxide, lead oxide, manganese oxide, or cobalt oxide, adding the same to a solution of sodium or potassium silicate, and milk of lime, in proportions varying according to the different products to be obtained. When in the specification the term "resin" is used, this is meant to cover the usual varnish resins.

The oil, pure or with resins, after being conveniently catalyzed with the named metallic oxides, and at temperatures which also may be varied, is added to the solution of sodium or potassium silicate and milk of lime, which, submitted to violent agitation, forms the emulsion, or colloidal solution in water.

In order to explain the present invention, I give an example of a formula used by me, being the same used to produce the samples that accompany this application.

*Example with Oiticica oil*

|  | Parts |
|---|---|
| Oiticica oil, pure (heated to 230° C.) | 120 |
| To be added: |  |
| Resins | 30 |
| Litharge | 6 |
| Manganese peroxide or cobalt oxide | 2 |

Heat the mixture to 250° C., then let the temperature of the compound drop to 200° C., and at this temperature add the compound to the following water solution:

|  | Parts |
|---|---|
| Silicate of sodium or potassium | 13 |
| Milk of lime | 16 |
| Water | to complete solution |

When the addition of the compound into the solution begins, the solution must be energetically agitated, until the temperature has reached 20 to 26° C.

In this way I have obtained an emulsion of oil containing oleate-resinate of lead and manganese (or cobalt), which incorporated with basic or neutral colouring pigments, forms a product that, mixed with water, is suitable for application on cement, lime, wood or stucco surfaces.

This product rapidly oxidizes after being applied, becoming then completely insoluble in water, while before the oxidation water is its principal and preferred diluent.

The product dries in forming a film, first by the evaporation of the water, and later by the oxidation of the treated oil; the drying being so far advanced within three to four hours after the application as to be insoluble in water, and therefore washable, and resistant to wear and use. The resulting layer or cover is hard and elastic, forming a surface of agreeable aspect, without stains, and without any smell in the rooms where it has been applied, adhering strongly to surfaces of cement or lime, after short drying.

The invention consists in a process that brings siccative oil into the form of an emulsion or colloidal solution in water, for applying the same on surfaces of cement, lime, wood, and stucco. The product dries on surfaces of these materials with perfect smoothness (which is not the case with the common paints); the product can be used as substitute for rubber glue, in glueing wood, leather or rubber to each other, or on surfaces of cement, iron &c.; it can be used also as cement for painters and glaziers.

I claim:

1. A method of producing a surface protecting material consisting in catalytically treating about 120 parts siccative oil with 6 parts litharge and 2 parts of an oxide selected from the group consisting of manganese oxide and cobalt oxide, heating the mixture to about 250° C., then reducing the temperature to about 200° C. and thereupon adding the thus treated oil to the following solution: about 13 parts potassium silicate, 16 parts of milk of lime and a suitable quantity of water, while submitting the mass to violent agitation until the temperature has dropped to about 20 to 26° C.

2. A method of producing a surface protecting material consisting in catalytically treating about 120 parts siccative oil with 6 parts litharge and 2 parts of manganese oxide, heating the mixture to about 250° C., then reducing the temperature to about 200° C. and thereupon adding the thus treated oil to the following solution: about 13 parts potassium silicate, 16 parts of milk of lime and a suitable quantity of water, while submitting the mass to violent agitation until the temperature has dropped to about 20 to 26° C.

ORLANDO DA CRUZ SARDINHA.